United States Patent [19]

Wang

[11] Patent Number: 5,092,146
[45] Date of Patent: Mar. 3, 1992

[54] STEERING WHEEL LOCK

[75] Inventor: Mao-Hsiung Wang, Tainan Hsien, Taiwan

[73] Assignee: Bheeng IU Industrial Co., Ltd., Chia Yi, Taiwan

[21] Appl. No.: 651,606

[22] Filed: Feb. 6, 1991

[51] Int. Cl.⁵ .............................................. B60R 25/02
[52] U.S. Cl. ........................................ 70/209; 70/238; 70/226
[58] Field of Search ................. 70/209, 238, 225, 226, 70/207

[56] References Cited

U.S. PATENT DOCUMENTS

| | | | |
|---|---|---|---|
| 3,742,743 | 7/1973 | Stoyanovitch | 70/209 |
| 4,103,524 | 8/1978 | Mitchell | 70/209 |
| 4,730,470 | 3/1988 | Zane | 70/238 |
| 4,935,047 | 6/1990 | Wu | 70/209 |

Primary Examiner—Renee S. Luebke
Assistant Examiner—Suzanne L. Dino
Attorney, Agent, or Firm—Bacon & Thomas

[57] ABSTRACT

A steering wheel lock is disclosed having a fork rod extending from one end of tubular rod and a 'U' shaped hook at other end. To control the extended length of the fork rod an engaging member is pushed inwardly through a lock mechanism. The fork rod will be pushed outwardly until it engages one side of the rim of the steering wheel and the 'U' shaped hook the other side. The lock will limit the operating movement of the wheel. When it is desired to unlock the steering wheel, a legal key is inserted into the lock mechanism to release the engaging member, enabling the fork rod to retract and release the rim of the wheel.

4 Claims, 5 Drawing Sheets

STEERING WHEEL LOCK

THE PRIOR ART

Let's take the U.S. Pat. No. 4,738,127 as an example (shown in FIGS. 4 and 5). The patented steering wheel lock comprises a lock mechanism 9, a knotted rod 91 and a tubular rod 94. The knotted rod 91 is inserted through the lock member 9 and into the tubular rod 94 and its extended length is controlled by the lock mechanism 9. When it is desired to lock a steering wheel, the lock mechanism 9 is unlocked with a legal key to the knotted rod 91 from its locked position. The knotted rod 91 is adjusted to allow a hook 93 to reach to one side of the steering wheel rim and another hook 95 on the tubular rod 94 will reach to the opposite rim of the wheel. Upon removal of the legal key the two hooks 93 and 95 are securely locked on the wheel and the extended portion of the tubular rod 94 can prevent illegal turning of the steering wheel.

BACKGROUND OF THE INVENTION

The automobile has always been considered one of the most convenient forms of transportation available to us, whether from home to work, or for shopping. It is one of the most essential vehicles in our daily life. Owing to this basic requirement, many thieves steal cars and sell to a garage or other places for easy money.

In view of this, many kinds of locks have been invented to prevent car theft, such as alarm, stick lock, door lock, steering wheel lock, etc. Among these, the steering wheel lock is one of the most popular one adopted by users. A car alarm may sometimes missound and a stick lock is not easy to operate.

Such a lock still possesses some inconveniences, and the inventor has devised an improved steering wheel lock which is more convenient and more secure than those of the prior art.

SUMMARY OF THE INVENTION

It is the primary object of the present invention to provide an improved steering wheel lock which is more secure.

It is another object of the present invention to provide an improved steering wheel lock which is convenient to use.

It is still another object of the present to provide an improved steering wheel lock which takes less space when stored.

It is a further object of the present invention to provide an improved steering wheel lock which is inexpensive to produce.

DETAILED DESCRIPTION OF THE PREFERRED EMBODIMENT

Figure 1:
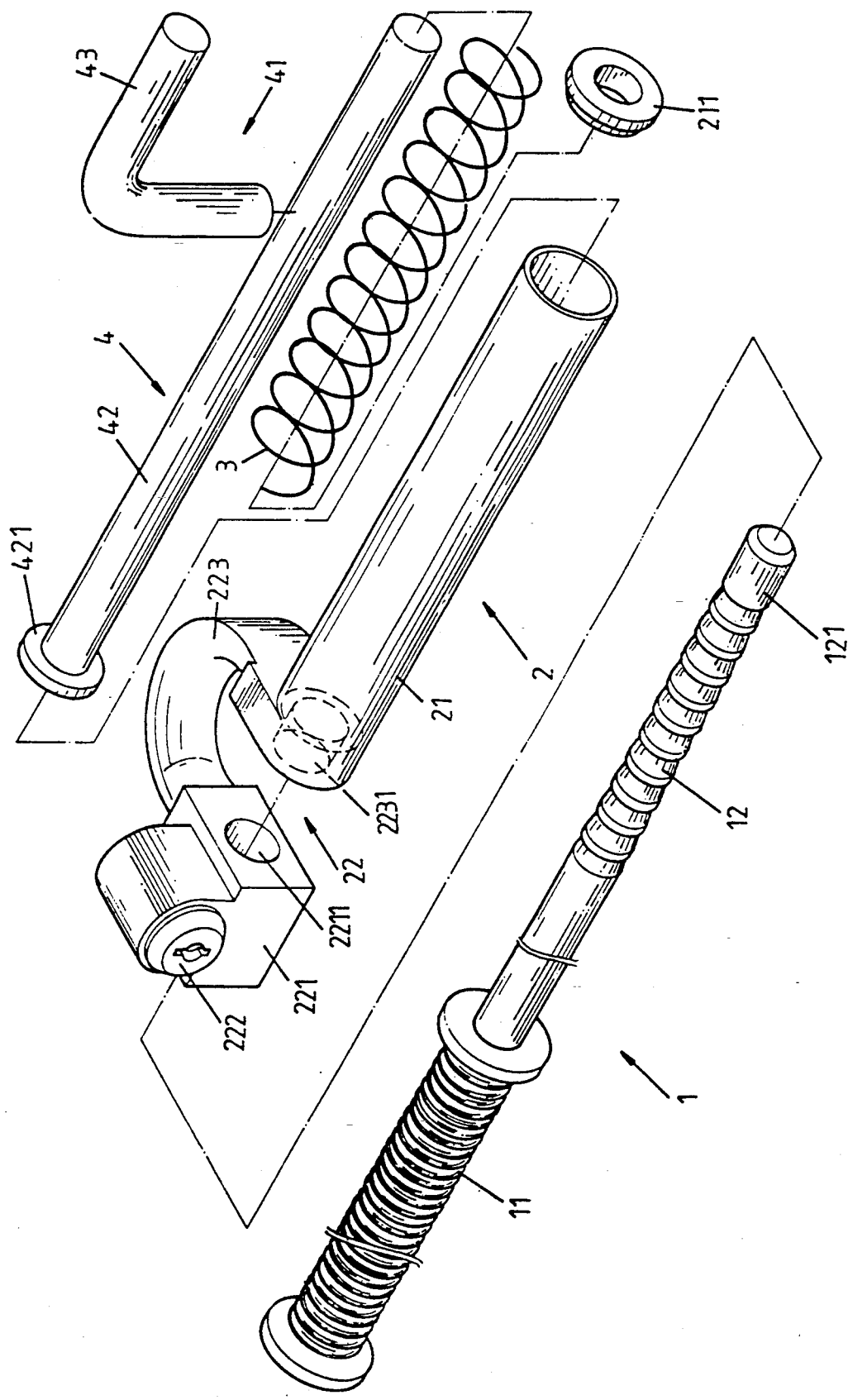
FIG. 1 is an exploded, perspective view of the present invention.
Figure 2:
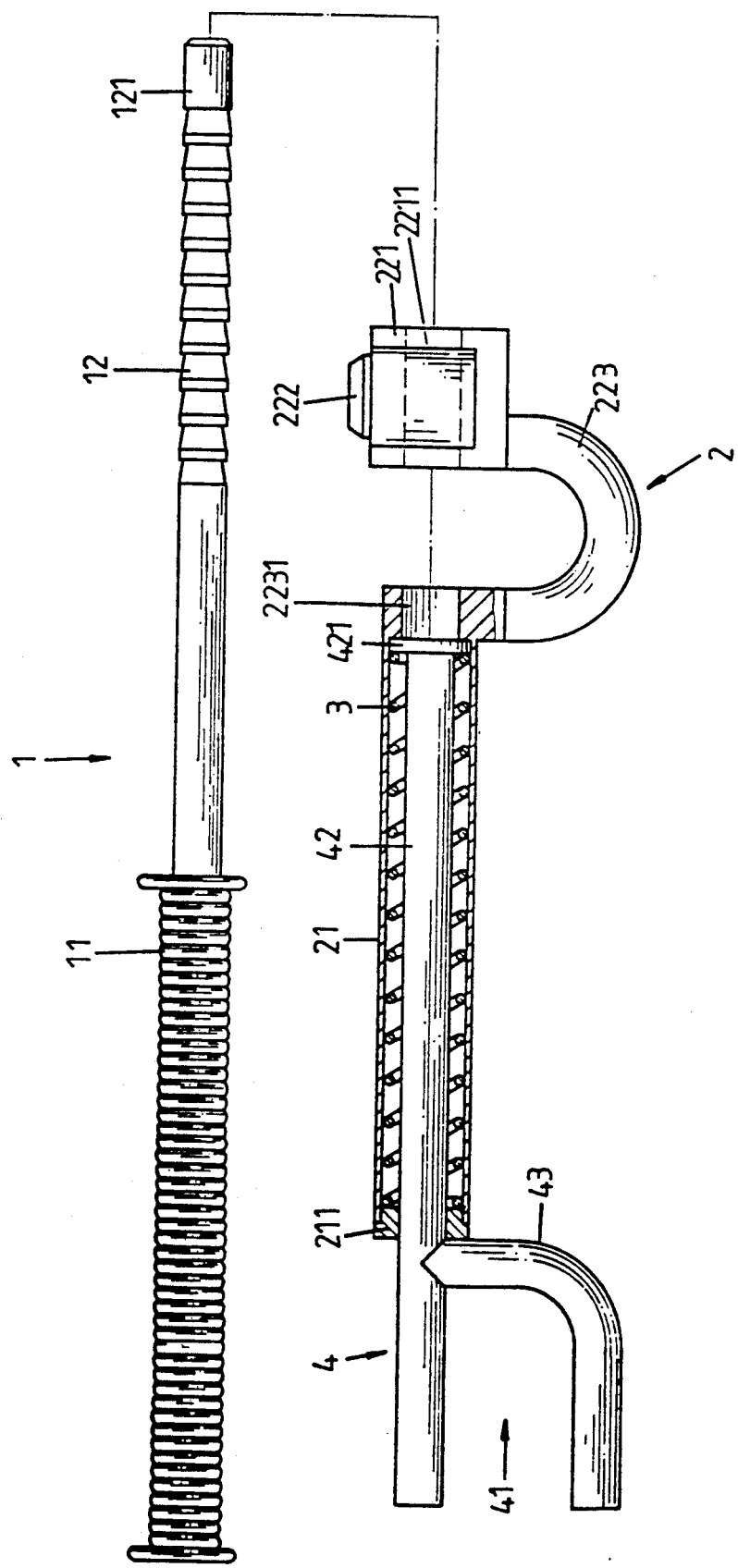
FIG. 2 is an exploded view, partially in cross-section, of the present invention.

Please refer to FIG. 1, wherein it can be seen that the present steering wheel lock comprises an engaging member 1, a tubular member 2, a spring 3 and a solid rod 4. The engaging member 1 has a handle 11 at one end, several knots 12 close to another end and a push head 121 at the other end. The tubular member 2 is a through bore tube and consists of a U-shaped hook 22 at one end and connected with a lock body 222. The inner end hole 2231 of the tubular member 2 is close to the U-shaped hook 22 and is small in size so that it will stop a stopper 421 which to located at one end of the solid rod 4. Rod 4 has a L-shaped rod 43 welded at one side that forms a fork 41. The spring 3 is placed between the stopper 421 and the fork 41. To assemble the device, firstly, place the solid rod 4 into the tubular member 2 with the stopper 421 inwardly toward the inner end hole 2231 and cap the other end of the tubular member 2 with stop ring 211, but leave the fork end 41 outside of the stop ring 211, as shown in FIG. 2. Secondly, insert the engaging member 1 through a lock hole 2211 and into the inner end hole 2231 until the first knot 12 has reached to the lock mechanism 221.

Figure 3:
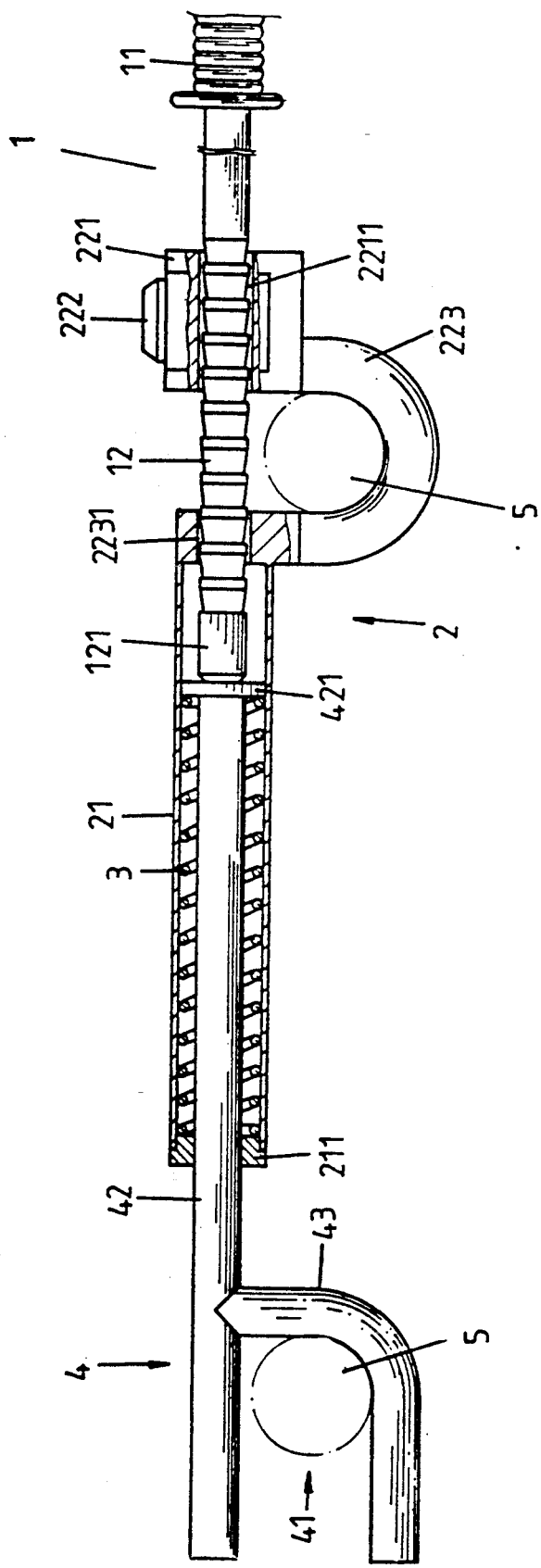
FIG. 3 is a side cross-sectional view of the present invention.
Figure 4:
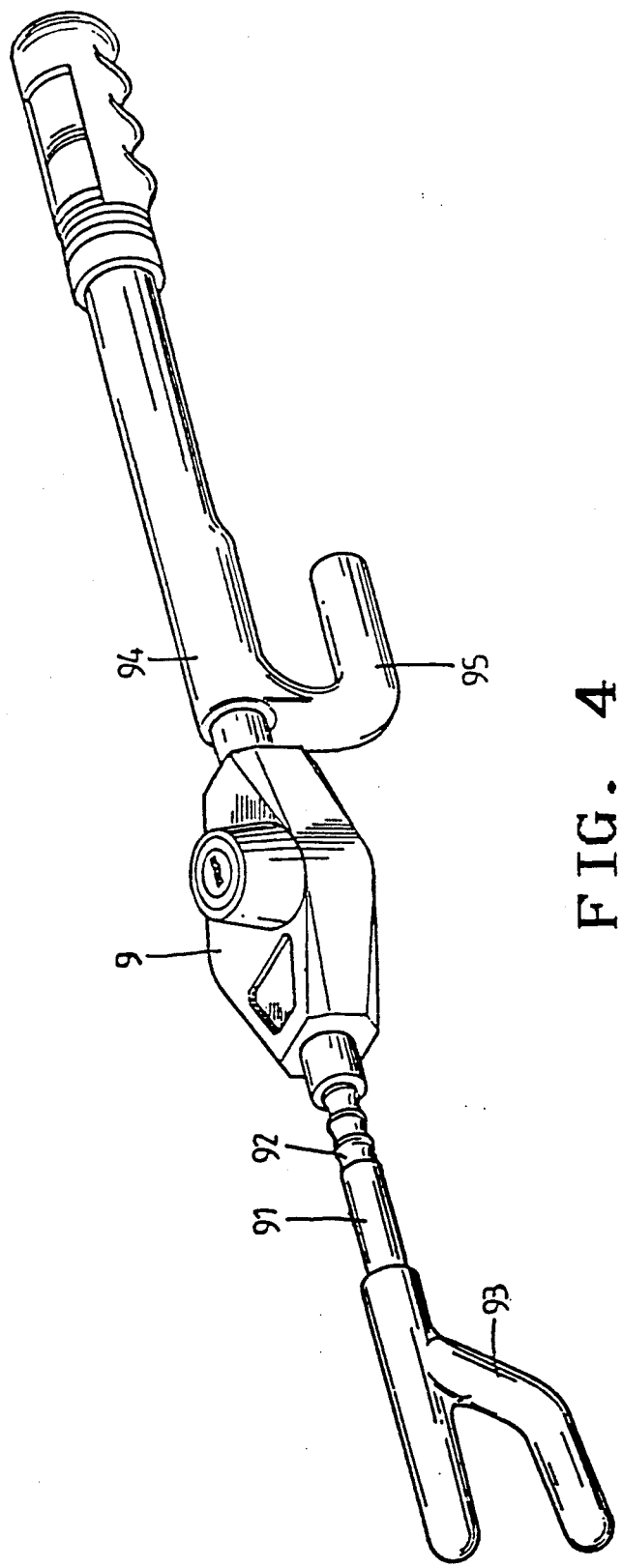
FIG. 4 is a perspective view of a known steering wheel lock.
Figure 5:
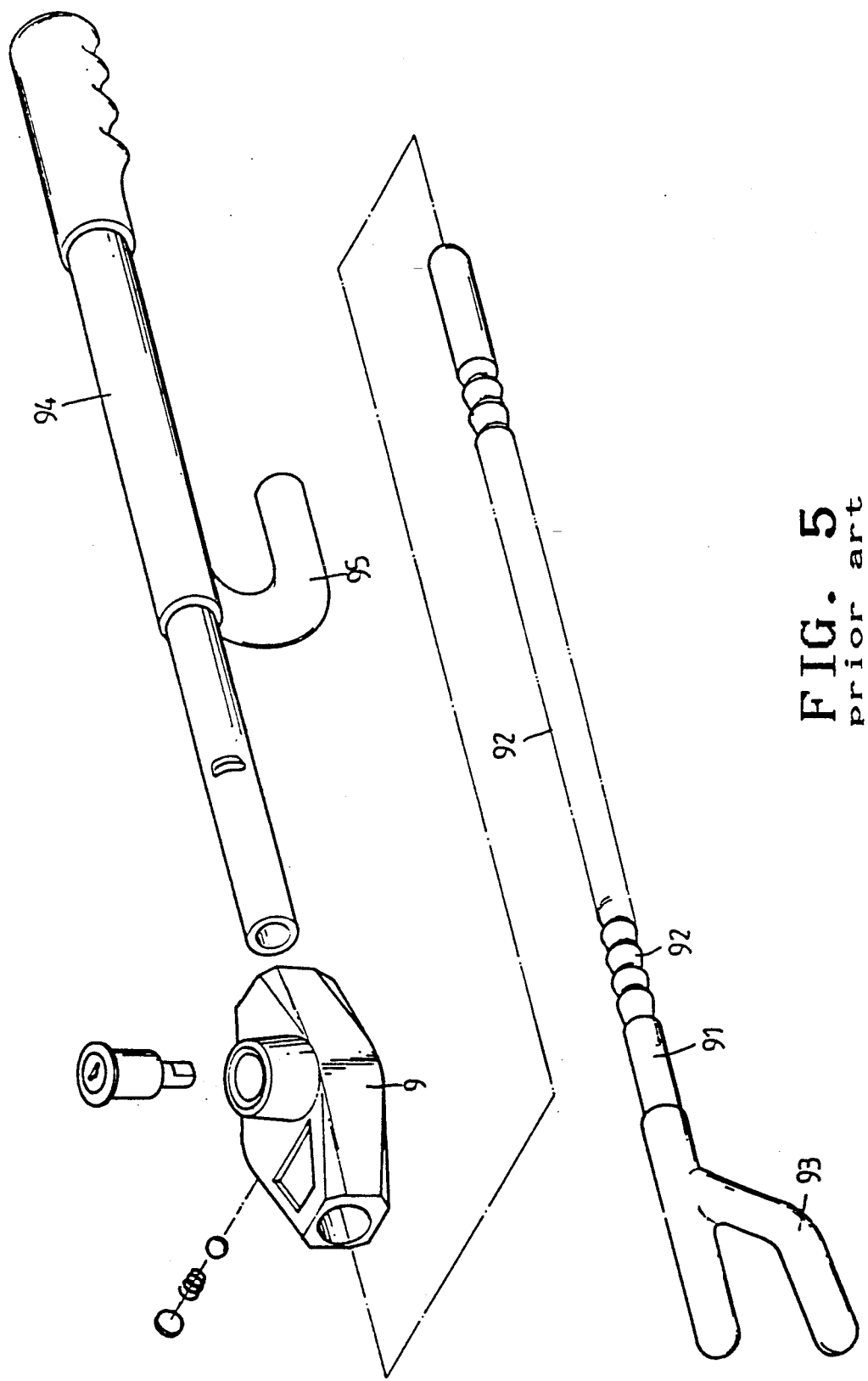
FIG. 5 is an exploded perspective view of the steering wheel lock shown in FIG. 4.

To use the device, first pull out the engaging member 1 and place the U-shaped hook 22 around a section of a steering wheel rim 5 (see FIG. 3) then insert the engaging member 1 into the lock mechanism 221. The fork end 41 in the meantime is in its retracted position and has not reached the opposite side of the wheel rim. Then push the engaging member 1 inwardly. The knots 12, because of their slanted surfaces, will slide through the lock mechanism 221 and its push head 121 will contact the stopper 421. Further pushing force will push the solid rod 4 outwardly until the fork end 41 has reached a portion of the rim 5. The pushing force of the engaging member 1 can be stopped and the steering wheel is in locked position (as shown in FIG. 3). When pushing the engaging member 1 inwardly, the stopper 421 in a chain reaction, will compress the spring 3 until the pushing force from the engaging member 1 is stopped. It is to be noted that the slanting surfaces of the knots 12 allow the engaging member 1 to pass through the lock mechanism without the requirement of a legal key. However, in order for the engaging member 1 to be pulled out, a legal key has to be inserted into the key hole to release the engaging member 1. The spring 3, because of its elastic force, will push the stopper 421 backward and return to its original position which also pulls the fork 41 backward to disengage the rim 5. The engaging member 1 may then be pulled out and the U-shaped hook 223 removed from the rim 5.

I claim:
1. An improved steering wheel lock comprising:
   a) a tubular member having a generally "U"-shaped hook portion;
   b) a lock mechanism operatively associated with the generally "U"-shaped hook portion;
   c) a rod member slidably associated with the tubular member, the rod member defining a fork portion and adapted to move between retracted and extended positions with respect to the tubular member;
   d) biasing means operatively interposed between the rod member and the tubular member so as to bias the rod member toward its retracted position;

e) an engaging member adapted to contact the rod member such that a force exerted on the engaging member will move the rod member against its biasing force toward its extended position; and, f) means on the engaging member adapted to operatively associate with the lock mechanism so as to prevent the return of the rod member to its retracted position.

2. The steering wheel lock of claim 1 wherein the generally "U"-shaped hook portion has legs of the "U" which extend generally perpendicular to a longitudinal axis of the tubular member.

3. The steering wheel lock of claim 1 wherein the biasing means comprises a coil spring.

4. The steering wheel lock of claim 3 wherein the coil spring is a compression coil spring.

* * * * *